(12) United States Patent
Lindemann et al.

(10) Patent No.: US 9,810,304 B2
(45) Date of Patent: Nov. 7, 2017

(54) TWO PASS MULTI-FUNCTION TORQUE CONVERTER

(71) Applicant: Schaeffler Technologies AG & Co. KG, Herzogenaurach (DE)

(72) Inventors: Patrick M. Lindemann, Wooster, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/168,796

(22) Filed: May 31, 2016

(65) Prior Publication Data

US 2016/0273636 A1 Sep. 22, 2016

Related U.S. Application Data

(62) Division of application No. 14/334,309, filed on Jul. 17, 2014, now Pat. No. 9,394,981.

(60) Provisional application No. 61/856,282, filed on Jul. 19, 2013.

(51) Int. Cl.
*F16H 45/02* (2006.01)
*F16H 41/24* (2006.01)
*F16H 45/00* (2006.01)

(52) U.S. Cl.
CPC ............ *F16H 45/02* (2013.01); *F16H 41/24* (2013.01); *F16H 2045/002* (2013.01); *F16H 2045/0205* (2013.01); *F16H 2045/0215* (2013.01); *F16H 2045/0221* (2013.01); *F16H 2045/0257* (2013.01); *F16H 2045/0263* (2013.01); *F16H 2045/0278* (2013.01)

(58) Field of Classification Search
CPC ............. F16H 41/24; F16H 2045/0263; F16H 2045/0257; F16H 2045/0205; F16H 2045/0221; F16H 2045/002; F16H 2045/0215; F16H 2045/0278
See application file for complete search history.

(56) References Cited

U.S. PATENT DOCUMENTS 5,346,043 A * 9/1994 Haka ....................... F16D 35/00
                                                    192/3.29
7,445,099 B2    11/2008 Maucher et al.
(Continued)

*Primary Examiner* — Ramya Burgess
*Assistant Examiner* — Lillian Nguyen
(74) *Attorney, Agent, or Firm* — Simpson & Simpson, PLLC

(57) ABSTRACT

A torque converter, including: a cover; an impeller including an impeller blade, and an impeller shell with a first surface extending beyond the impeller blade in a radial direction and at an acute angle with respect to a first line in the radial direction; a turbine including a turbine blade, and a turbine shell with a second surface axially aligned with the first surface and at the acute angle with respect to the first line; a turbine clutch including the first and second surfaces and friction material disposed between the first and second surfaces; a torus at least partially enclosed by the impeller and turbine shells; and a pressure chamber at least partially formed by the turbine shell and the cover. For torque converter mode, the turbine and the impeller are independently rotatably with respect to each other. For lock-up mode, the first and second surfaces are non-rotatably connected.

18 Claims, 11 Drawing Sheets

(56) References Cited

U.S. PATENT DOCUMENTS

| | | | |
|---|---|---|---|
| 9,285,030 B2* | 3/2016 | Lindemann | F16D 33/18 |
| | | | 415/122.1 |
| 2009/0157272 A1 | 6/2009 | Uhler et al. | |
| 2013/0230385 A1 | 9/2013 | Lindemann et al. | |
| 2014/0097055 A1* | 4/2014 | Lindemann | F16H 41/24 |
| | | | 192/3.21 |
| 2015/0053521 A1* | 2/2015 | Frary | F16H 45/02 |
| | | | 192/3.25 |

* cited by examiner

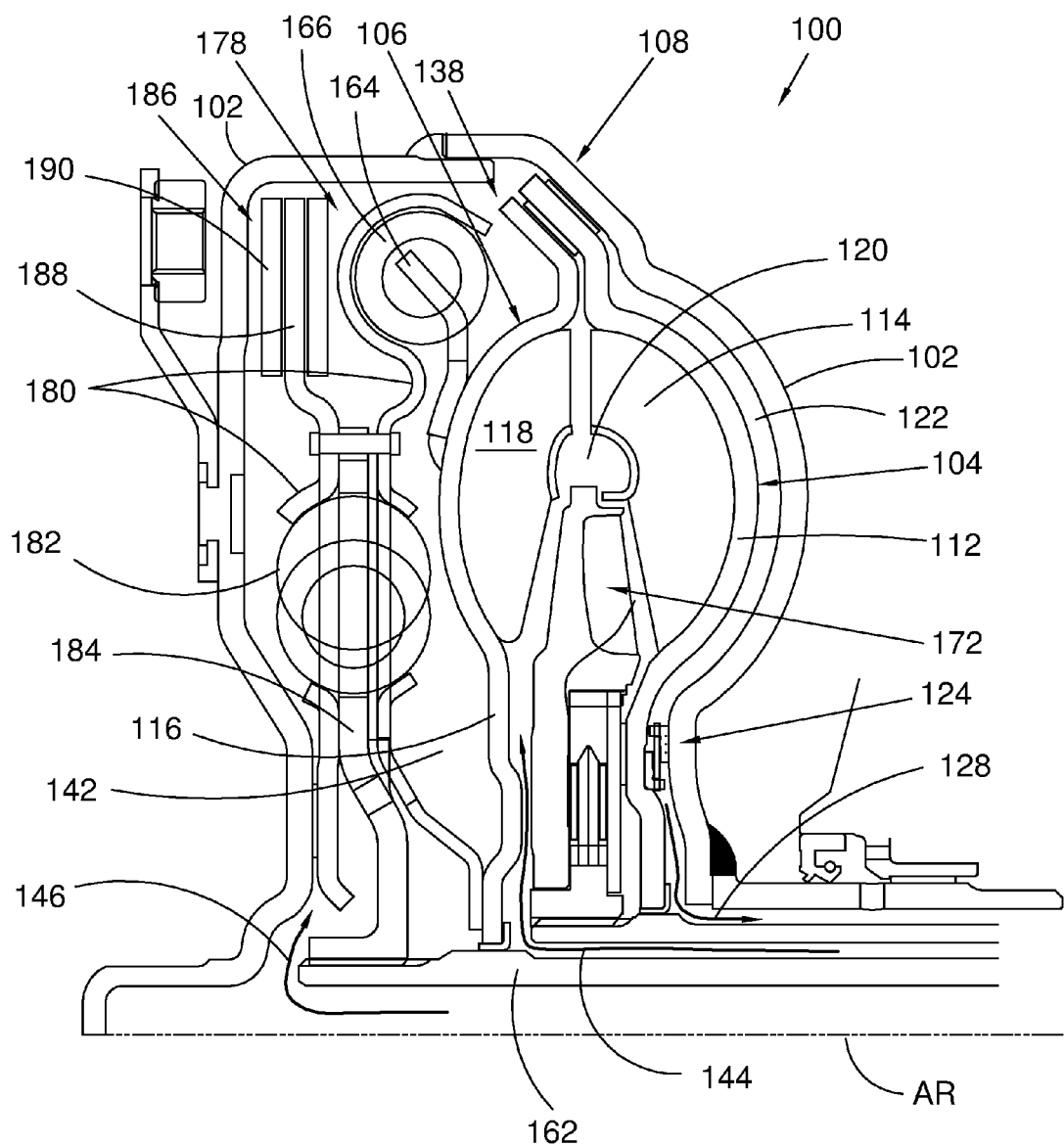
Fig. 8
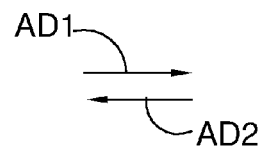

TWO PASS MULTI-FUNCTION TORQUE CONVERTER

CROSS-REFERENCE TO RELATED APPLICATIONS

This application is a divisional patent application filed under 35 U.S.C. §§120 and 121 based on U.S. patent application Ser. No. 14/334,309, filed Jul. 17, 2014, which application is incorporated by reference to its entirety. U.S. patent application Ser. No. 14/334,309 claims the benefit under 35 U.S.C. §119(e) of U.S. Provisional Patent Application No. 61/856,282, filed Jul. 19, 2013, which application is incorporated herein by reference in its entirety.

TECHNICAL FIELD

The present disclosure relates to a two pass multi-function torque converter with a resilient element for opening an impeller clutch.

BACKGROUND

A multi-function torque converter with an impeller clutch to substantially non-rotatably connect an impeller to a cover for the torque converter, and a torque converter clutch to connect a turbine to the cover is known. It is know to use three controllable fluid circuits (three-pass) to provide pressurized fluid to and to drain fluid from the torus and two pressure chambers to control operation of the impeller and torque converter clutches. A pump in a transmission is typically used to provide pressurized fluid for the torque converter and to drain fluid from the torque converter. However, most known transmissions can only provide two controllable fluid circuits making the three-pass design unusable with these transmissions.

For a multi-function torque converter with only two controllable fluid circuits (two-pass), it is known to close the impeller clutch and then to close the torque converter clutch in series. For example, to use the same fluid circuit to provide apply pressure to close both the impeller clutch and the torque converter clutch. However, this process reduces the pressure bandwidth for both clutches. Further, the torque converter clutch apply pressure for known multi-function torque converters typically starts at a higher level than in a conventional torque converter. As a result, there is need for higher pressure in the circuit and increased pump capacity, and efficiency of the hydraulic system decreases. In addition, with a two-pass design it is difficult to control the closing of the impeller clutch, for example, the impeller clutch typically closes too abruptly causing an uncomfortable sensation for the driver of the vehicle including the torque converter.

FIG. 11 is a partial cross-sectional view of prior art torque converter 300 with turbine clutch 302. Torque converter 300 includes cover 304, impeller 306 with impeller shell 308, and turbine 310 including turbine shell 312. Clutch 302 acts as a lock-up clutch for converter 300. For example, for torque converter mode, pressure in torus 314, formed by impeller 306 and turbine 308, is greater than pressure in chamber 316 at least partially formed by cover 304 and turbine shell 312, and clutch 302 is open. Torque flows from the cover to output hub 318 via impeller 306, the turbine 310, and torsional damper 320.

In lock-up mode, pressure in chamber 316 is greater than pressure in torus 314, closing clutch 302 and non-rotatably connecting impeller shell 308 and turbine 310. Torque flows from cover 304 to hub 318 via shell 308, shell 312, and damper 320.

In lock-up mode, high pressure in chamber 316 is needed to close clutch 302. This pressure results in force F1 in direction D on portions 312A and 308A of turbine shell 312 and impeller shell 308, respectively. Portion 308B of shell 308 is relatively thick and buttressed by blades 322 for the impeller. Portion 308A is relatively flexible compared to portion 308B. Therefore, in response to force F1, portion 308B remains stable and portion 308A flexes in direction D. As a result of the flexing of portion 308A, stress and strain is placed on corner 308C of shell 308 decreasing the service life of shell 308 and increasing the likelihood of failure of shell 308.

SUMMARY

According to aspects illustrated herein, there is provided a multi-function torque converter, including: a cover arranged to receive torque; an impeller including an impeller shell and at least one impeller blade connected to the impeller shell; a turbine including a turbine shell and at least one turbine blade connected to the turbine shell; a torus at least partially enclosed by the impeller and turbine shells; a first pressure chamber at least partially formed by the impeller shell and the cover; in impeller clutch including a portion of the impeller shell; and a resilient element assembly located in the first pressure chamber. Pressure in the torus is arranged to displace the impeller shell in a first direction to substantially non-rotatably connect the portion of the impeller shell to the cover for a closed mode for the impeller clutch. The resilient element assembly urges, with a first force, the impeller shell in a second direction opposite the first direction.

According to aspects illustrated herein, there is provided a multi-function torque converter, including: a cover arranged to receive torque; an impeller including an impeller shell and at least one impeller blade connected to the impeller shell; a turbine including a turbine shell and at least one turbine blade connected to the turbine shell; a torus at least partially enclosed by the impeller and turbine shells; a first pressure chamber at least partially formed by the impeller shell and the cover; an impeller clutch including a portion of the impeller shell; and a resilient element assembly located in the first pressure chamber. Fluid pressure in the torus is arranged to exert a first force on the impeller shell to displace the impeller shell in a first direction to substantially non-rotatably connect the portion of the impeller shell to the cover for a closed mode for the impeller clutch. The resilient element assembly applies a second force to the impeller shell in a second direction opposite the first direction. When the second force is greater than the first force, the resilient element assembly is arranged to displace the impeller shell in the second direction to disengage the impeller shell and cover for an open mode for the impeller clutch.

According to aspects illustrated herein, there is provided a multi-function torque converter, including: a cover arranged to receive torque; an impeller including an impeller shell and at least one impeller blade connected to the impeller shell; a turbine including a turbine shell and at least one turbine blade connected to the turbine shell; a torus at least partially enclosed by the impeller and turbine shells; a first pressure chamber at least partially formed by the impeller shell and the cover; a second pressure chamber at least partially formed by the turbine shell and the cover; an impeller clutch including a portion of the impeller shell; a resilient element assembly located in the first pressure chamber and urging the impeller shell in a first direction with a first force; and a turbine clutch including a portion of the turbine shell. When a second force, produced by fluid pressure in the torus, in a second direction opposite the first direction is greater than the first force, the second force is arranged to displace the impeller shell in the second direction to substantially non-rotatably connect the portion of the impeller shell and the cover for a closed mode for the impeller clutch. When the first force is greater than the second force, the resilient element assembly is arranged to displace the impeller shell in the first direction to disengage the impeller shell and cover for an open mode for the impeller clutch. A difference the fluid pressure in the torus and fluid pressure in the second chamber is arranged to displace the turbine shell in the first or second direction to disengage or engage, respectively, the portion of the turbine shell with the portion of the impeller shell.

According to aspects illustrated herein, there is provided a torque converter, including: a cover arranged to receive torque; an impeller including at least one impeller blade, and an impeller shell with a first surface extending beyond the at least one impeller blade in a radial direction orthogonal to an axis of rotation for the torque converter and at an acute angle with respect to a first line in a radial direction orthogonal to an axis of rotation for the torque converter; a turbine including at least one turbine blade, and a turbine shell with a second surface aligned with the first surface so that a second line parallel to the axis of rotation passes through the first and second surfaces and at the acute angle with respect to the first line; a turbine clutch including the first and second surfaces and friction material disposed between the first and second surfaces; a torus at least partially enclosed by the impeller and turbine shells; and a first pressure chamber at least partially formed by the turbine shell and the cover. For a torque converter mode, the turbine and the impeller are independently rotatably with respect to each other. For a lock-up mode, the first and second surfaces are non-rotatably connected.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 8 is a partial cross-sectional view of a multi-function torque converter with a series damper, a vibration absorber and a resilient element assembly for an impeller clutch;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
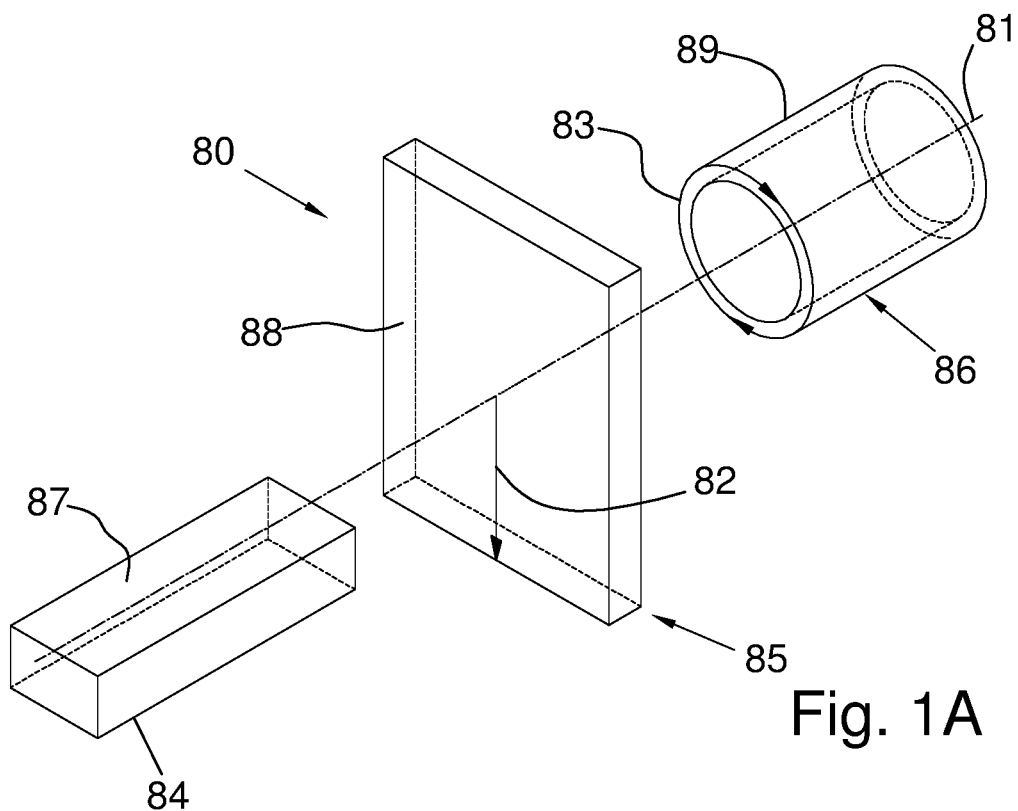
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
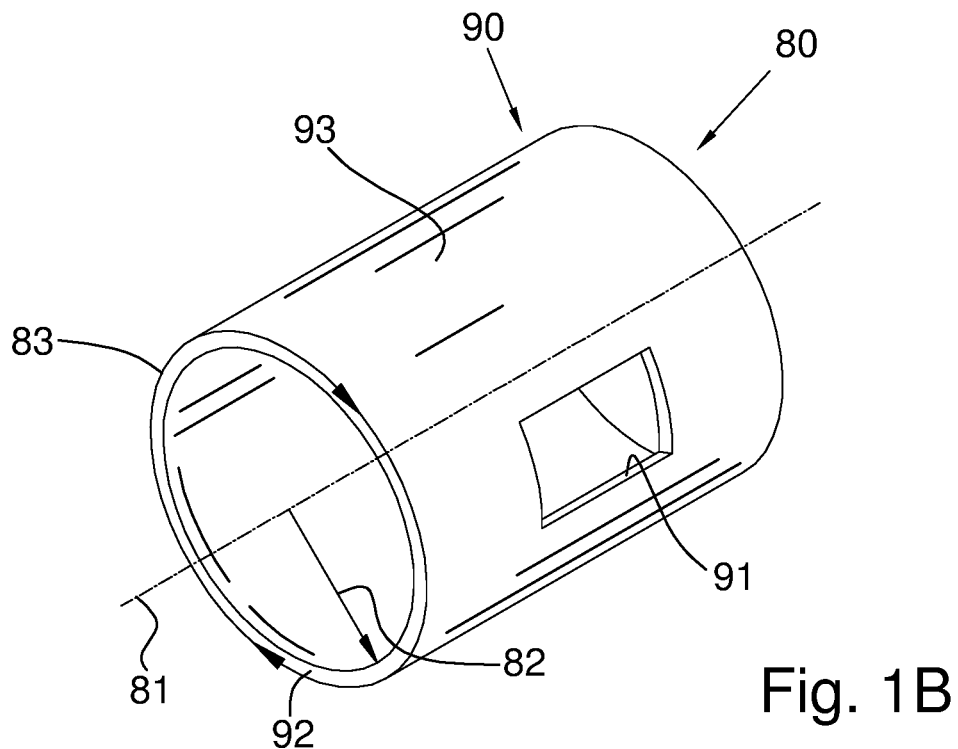
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93.

Surface 91 is part of an axial plane, surface 92 is part of a radial plane, and surface 93 is a circumferential surface.

Figure 2:
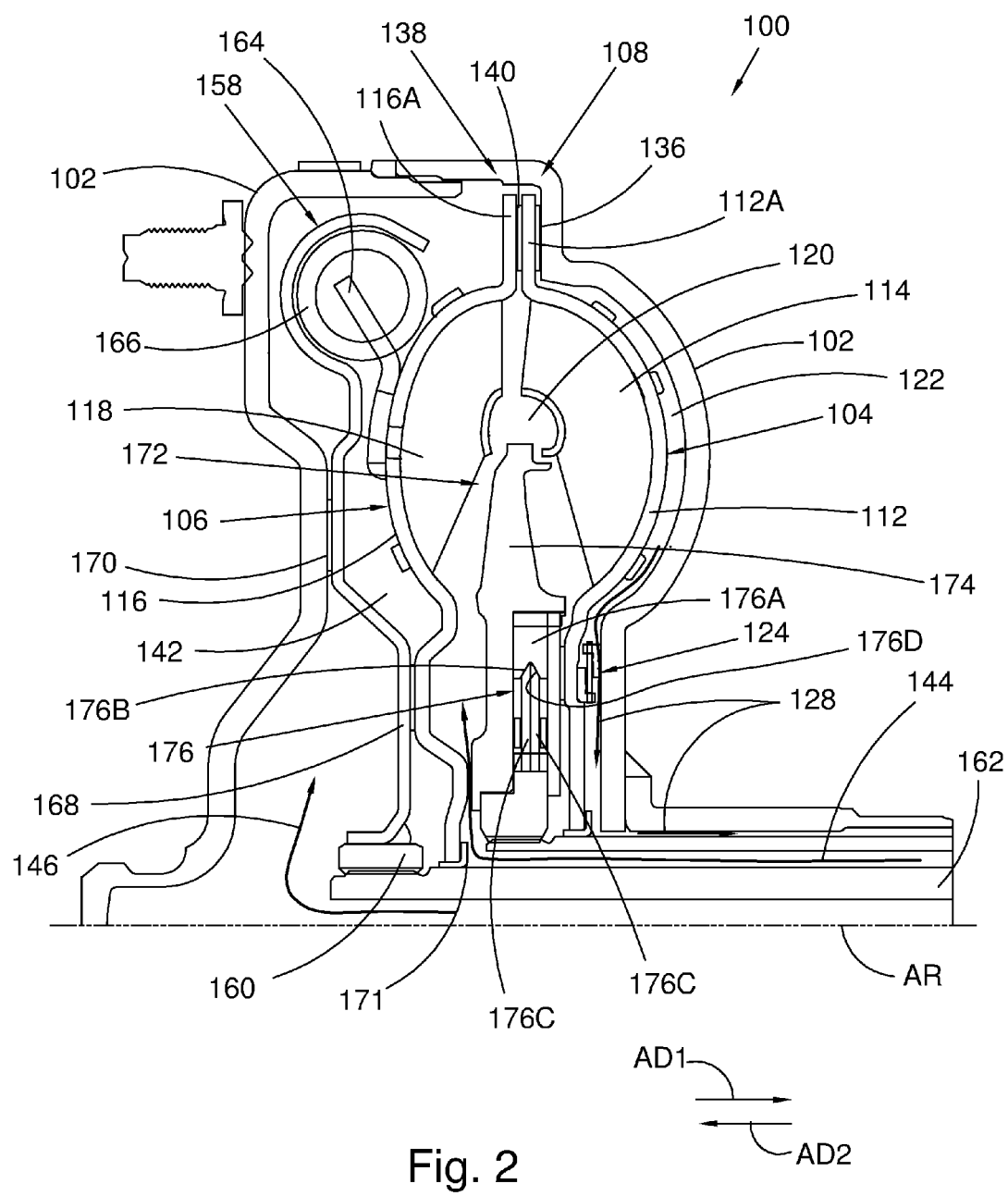
FIG. 2 is partial cross-sectional view of a multi-function torque converter with a resilient element assembly for an impeller clutch.

FIG. 2 is partial cross-sectional view of multi-function torque converter 100 with a resilient element assembly for an impeller clutch.

Figure 3:
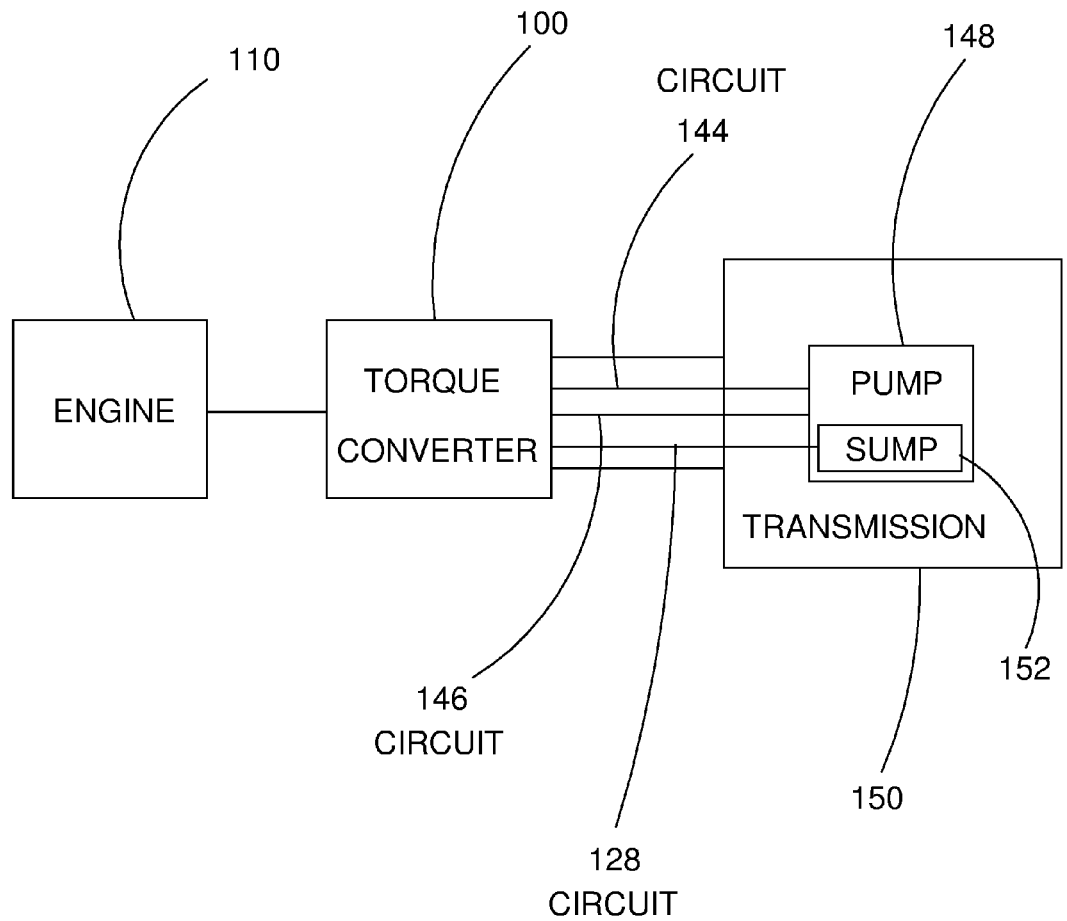
FIG. 3 is a schematic block diagram of the multi-function torque converter of FIG. 2 in a vehicle drive train.

FIG. 3 is a schematic block diagram of multi-function torque converter 100 of FIG. 2 in a vehicle drive train. The following should be viewed in light of FIGS. 2 and 3. Multi-function torque converter 100 includes axis of rotation AR, cover 102, impeller 104, turbine 106, and impeller clutch 108. Cover 102 is arranged to receive torque, for example from engine 110. Impeller 104 includes impeller shell 112 and at least one impeller blade 114 connected to the impeller shell. Turbine 106 includes turbine shell 116 and at least one turbine blade 118 connected to the turbine shell. Converter 100 includes torus 120, at least partially enclosed by the impeller and turbine shells, pressure chamber 122 at least partially formed by the impeller shell and the cover, and resilient element assembly 124 located in pressure chamber 122. Impeller clutch 108 includes portion 112A of the impeller shell. Pressure in the torus is arranged to displace the impeller shell in direction AD1, parallel to axis AR, to substantially non-rotatably connect portion 112A of the impeller shell to the cover for a closed mode for impeller clutch 108. By "substantially non-rotatably connect" or "substantially non-rotatably connected" we mean that some nominal relative rotation of components of the clutch in question, for example in the form of slip associated with normal operation of the clutch in question in the closed mode, may be possible for the clutch in question. In the closed mode, clutch 108 transmits torque from cover 102 to impeller 104.

Resilient element assembly 124 applies a force to the impeller shell in direction AD2, opposite direction AD1, that is, resilient element assembly 124 urges the impeller shell in direction AD2 with the force from resilient element assembly 124. When the force produced by fluid pressure in the torus is less than the force exerted by resilient element assembly 124 on the impeller shell, the resilient element assembly is arranged to displace the impeller shell in direction AD2 to disengage the impeller shell and cover for an open mode for the impeller clutch. In the open mode for clutch 108, impeller shell 112 and cover 102 are substantially independently rotatable, that is, there is at most only negligible contact between cover 102 and impeller shell 112.

Figure 4:
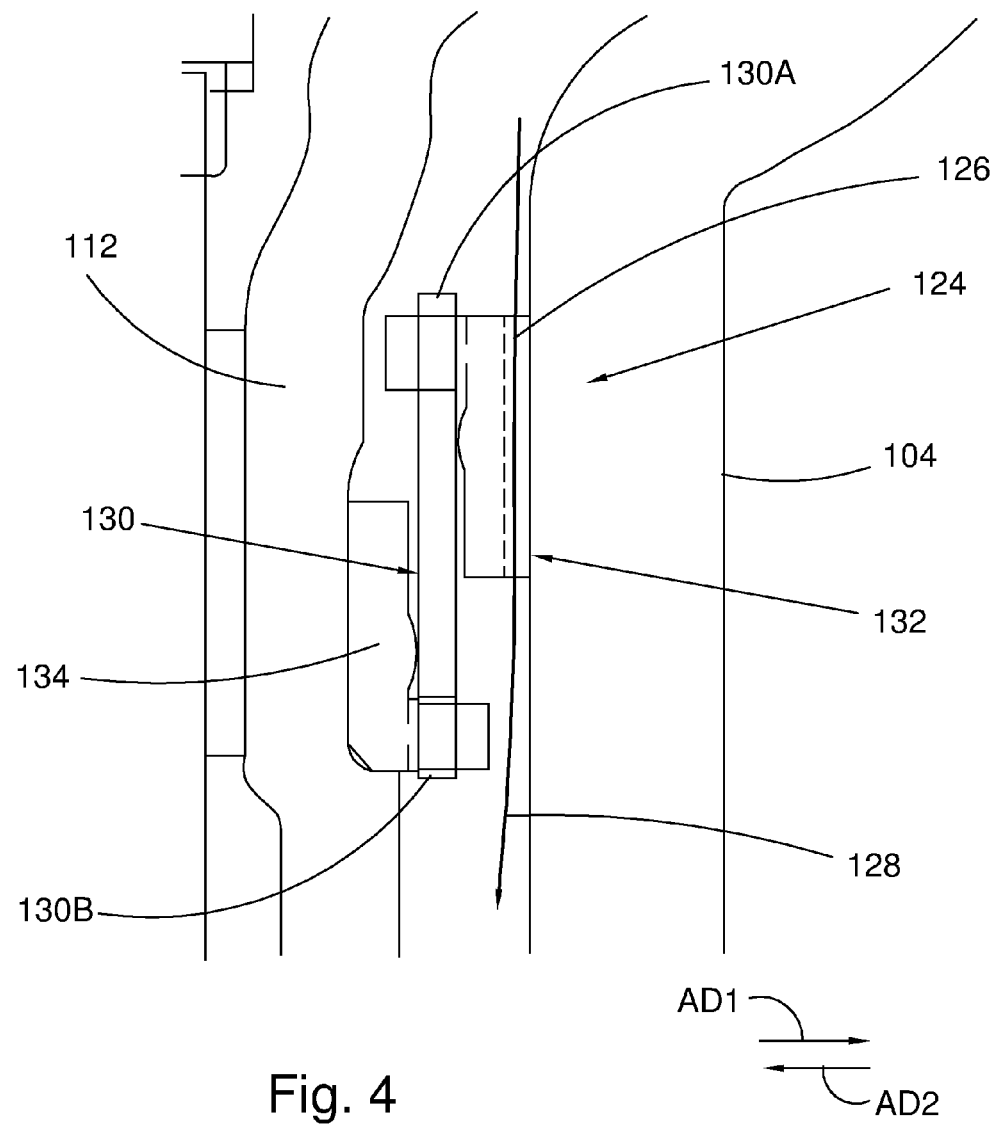
FIG. 4 is a detail of the resilient element assembly in the multi-function torque converter of FIG. 2.

FIG. 4 is a detail of resilient element assembly 124 in FIG. 2. The following should be viewed in light of FIGS. 2 through 4. Resilient element assembly 124 includes at least one groove 126. Radially inward flow of fluid out of pressure chamber 122, for example, fluid circuit 128, is at least partly through groove 126. In an example embodiment, the entirety of the radially inward flow is through groove(s) 126. In an example embodiment, resilient element assembly 124 includes diaphragm spring 130 with fingers 130A and 130B engaged with washers 132 and 134, respectively. Washer 132 is in contact with cover 102 and washer 134 is in contact with shell 112. In an example embodiment, washers 132 and 134 are plastic washers. Spring 130 reacts against washer 134 and cover 102 to apply force to washer 134 and shell 112 in direction AD2. One or both of washers 132 and 134 are slideable along cover 102 and shell 112, respectively, to enable relative rotation between cover 102 and shell 112. It should be understood that groove(s) 126 can be formed in washer 134 or that groove(s) 126 can be formed in each of washers 132 and 134.

Clutch 108 includes friction material 136. Portion 112A is radially outward from blade 114 and material 136 is between portion 112A and cover 102 in direction AD1. In the closed position for clutch 108, portion 112A, material 136 and cover 102 are substantially non-rotatably connected.

Converter 100 includes turbine clutch 138. In an example embodiment, clutch 138 includes portion 116A of the turbine shell and friction material 140. Portion 116A is located radially outward of turbine blade 118 and material 140 is between portion 116A and portion 112A in direction AD1. In the closed position for clutch 138, portions 112A and 116A and material 140 are substantially non-rotatably connected. In an open mode for clutch 138, impeller shell 114 and turbine shell 116 are substantially independently rotatable, that is, there is at most only negligible contact between impeller shell 114 and turbine shell 116.

Clutch 138 closes (closed mode) when fluid pressure in chamber 142, at least partially formed by cover 102 and shell 116, is sufficiently greater than fluid pressure in the torus, which displaces turbine shell 116 in direction AD1. Clutch 138 opens (open mode) when fluid pressure in torus 120 is sufficiently greater than fluid pressure in chamber 142, which displaces turbine shell 116 in direction AD2. Converter 100 includes fluid circuits 144 and 146. As further described below, only circuits 144 and 146 are actively controlled, that is, converter 100 is a two-pass converter. Circuit 144 is used to controllably provide pressurized fluid to the torus from pump 148 in transmission 150 and circuit 146 is used to controllably provide pressurized fluid to chamber 142 from pump 148. Circuits 144 and 146 are controlled to provide specified fluid pressures in chamber 142 and the torus to operate clutch 108 and 138.

Circuit 128 is connected to sump 152 of pump 148. There is no active control of circuit 128, for example, there is no control of back pressure between chamber 122 and the sump. Fluid passively drains from chamber 122 to the sump, for example, when shell 112 displaces in direction AD1 to close clutch 108. Fluid is replaced in chamber 122 by flow from chamber 142 and/or the torus. By "passively drains" we mean that the circuit from chamber 122 does not contain active elements, such as valves, to control the flow from chamber 122 to the sump.

Figure 5:
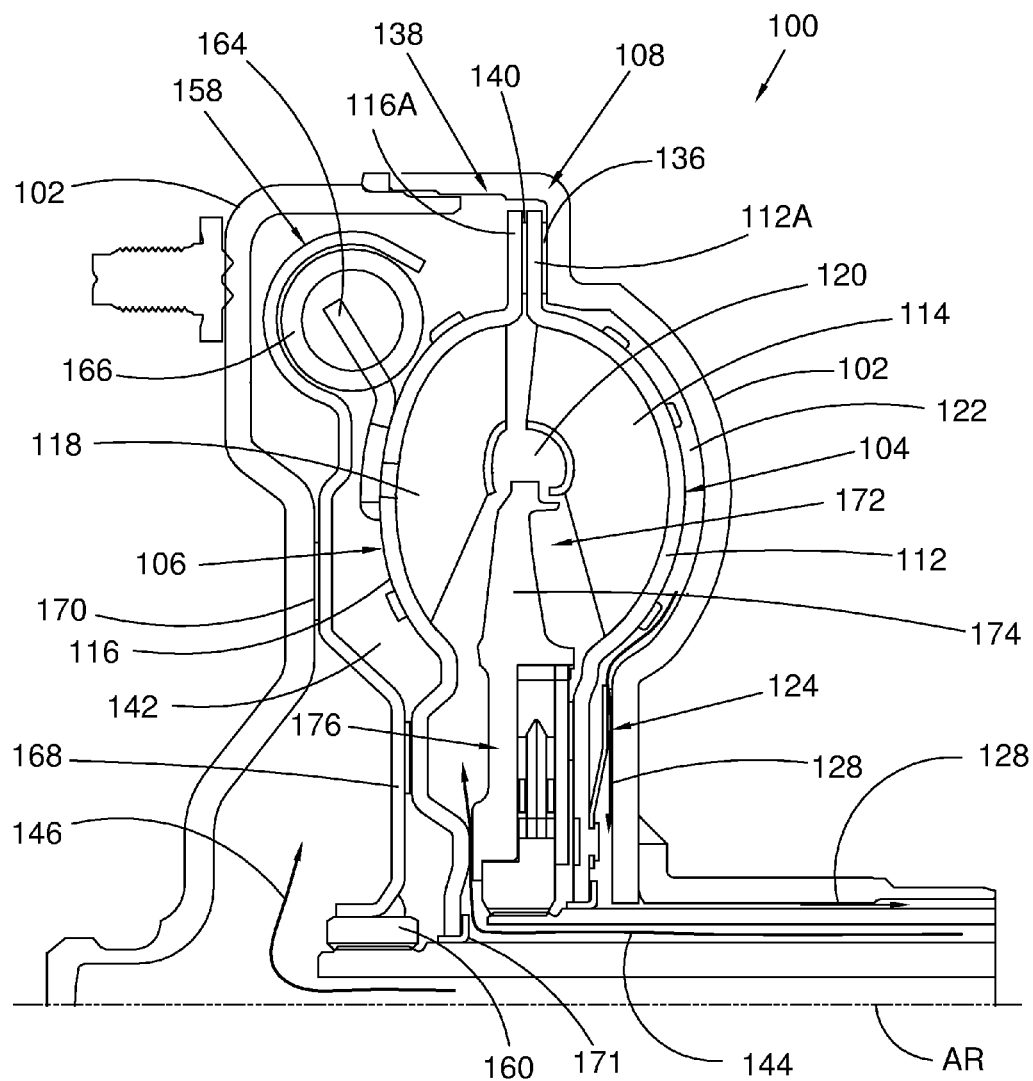
FIG. 5 is partial cross-sectional view of a multi-function torque converter with a resilient element assembly for an impeller clutch.

FIG. 5 is partial cross-sectional view of multi-function torque converter 100 with a resilient element assembly for an impeller clutch.

Figure 6:
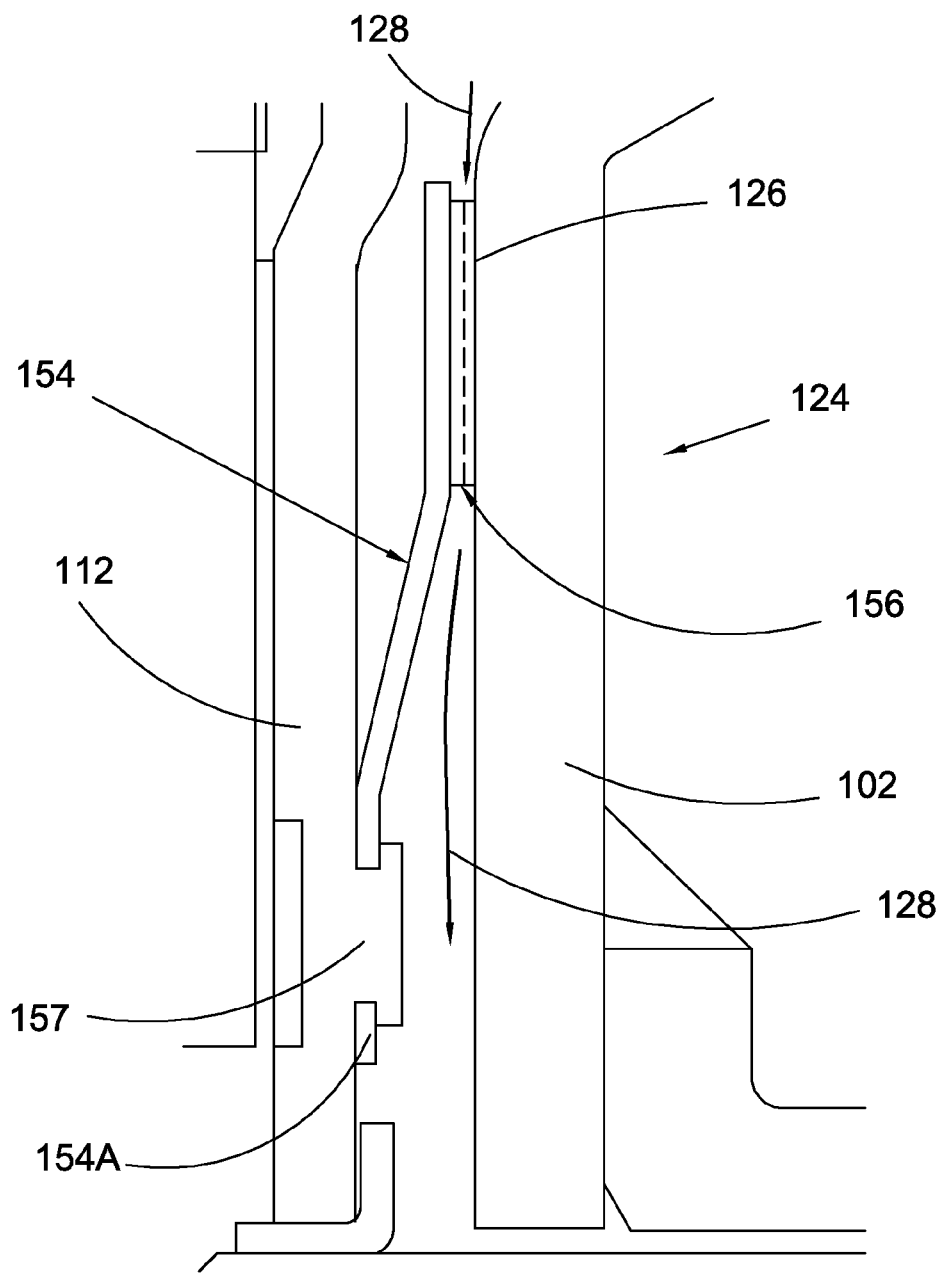
FIG. 6 is a detail of the resilient element assembly in the multi-function torque converter of FIG. 5.

FIG. 6 is a detail of the resilient element assembly in the multi-function torque converter of FIG. 5. The following should be viewed in light of FIGS. 2 through 6. The descriptions in FIGS. 2 through 4 of torque converter 100 are applicable to torque converter 100 in FIG. 5 except as noted. In an example embodiment, resilient element assembly 124 includes "S" shaped diaphragm spring 154 including friction material 156 in contact with cover 102. End 154A of spring 154 is non-rotatably connected to shell 112, for example, by rivet 157, and material 156 is slideable along cover 102 (rotates with shell 112) to enable relative rotation of cover 102 with respect to shell 112. Spring 154 reacts against friction material 156 and cover 102 to apply force to shell 112 in direction AD2. It should be understood that the configuration of spring 154 can be reversed, for example, end 154A can be fixedly secured to cover 102 and material 156 can be in contact with shell 112.

Advantageously, the two-pass (controlled fluid circuits 144 and 146) design of torque converter 100 eliminates the problems noted above for two-pass and three-pass multi-function torque converters. For example, since converter 100 is a two-pass design, converter 100 is usable with commonly-used and widely available two-pass transmissions. Converter 100 eliminates the need for a third controllable fluid circuit through the use resilient element assembly 124. Rather than supplying pressurized fluid to chamber 122 through circuit 128, force from resilient element assembly 124 is used to displace impeller shell 112 in direction AD2 to open clutch 108.

Further, resilient element assembly 124 and grooves 126 eliminate the harsh closing of the impeller clutch noted above. To close clutch 108, fluid pressure in the torus is increased to overcome the force applied by resilient element assembly 124, displacing shell 112 in direction AD1. The displacement of shell 112 in direction AD1 reduces the volume of chamber 122. In addition, fluid in the torus leaks between portion 112A and cover 102 until firm contact is made between portion 112A, friction material 136, and cover 102. The reduction of the volume of chamber 122 and the flow from the torus to chamber 122 urge fluid in chamber 122 to drain more quickly than desired for a smooth closing of clutch 108. Advantageously, grooves 126 restrict the flow of fluid out of chamber 122, leaving sufficient fluid in the chamber to slow the displacement of shell 112 and cushion the closing of clutch 108.

In an example embodiment, torque converter 100 includes torsional vibration damper 158 non-rotatably connected to output hub 160, which in turn is arranged to non-rotatably connect to transmission input shaft 162. In an example embodiment, at least one tab 164 of damper 158 is non-rotatably connected to shell 116 and engaged with at least one spring 166. Spring 166 is engaged with output flange 168, which is non-rotatably connected to the output hub. In an example embodiment, bushing 170 is located between cover 102 and flange 168 and bushing 171 forms a seal between chamber 142 and the torus.

In an example embodiment, torque converter 100 includes stator 172 with at least one blade 174 and one-way clutch 176. In an example embodiment, clutch 176 is a wedge clutch one-way clutch with outer race 176A including cone-shaped indent 176B, and wedge plates 176C with cone-shaped outer circumferential surfaces 176D.

Figure 7:
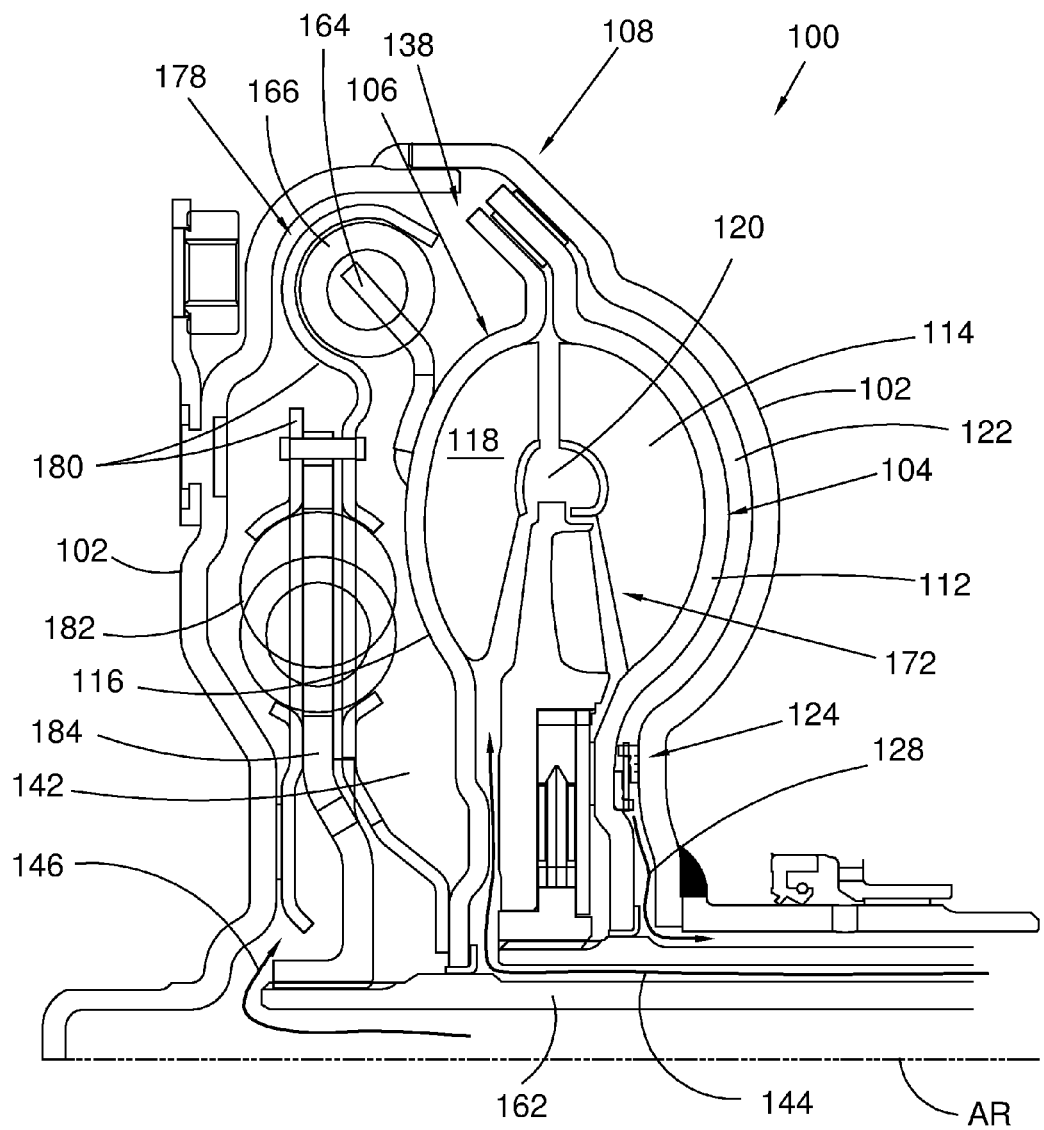
FIG. 7 is a partial cross-sectional view of a multi-function torque converter with a series damper and a resilient element assembly for an impeller clutch.
Figure 7:
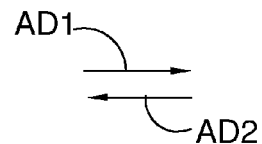

FIG. 7 is partial cross-sectional view of multi-function torque converter 100 with a resilient element assembly for an impeller clutch and a series damper. The descriptions of torque converter 100 in FIGS. 2 through 4 are applicable to torque converter 100 in FIG. 7 except as noted. In an example embodiment, converter 100 includes series damper 178 including at least one tab 164 and at least one spring 166. Spring 166 is engaged with intermediate plates 180, which are in turn engaged with at least one spring 182. Spring 182 is engaged with output flange 184, which is arranged for non-rotatable connection to input shaft 162. Torque converter 100 in FIG. 7 includes resilient element assembly 124 described in FIGS. 2 and 4.

FIG. 8 is partial cross-sectional view of multi-function torque converter 100 with a centrifugally actuated impeller clutch in a closed position, a series damper, and a vibration absorber. The descriptions of torque converter 100 in FIGS. 2 through 4 and 7 are applicable to torque converter 100 in FIG. 8 except as noted. In an example embodiment, converter 100 includes damper 178 and vibration absorber 186 with plate 188 non-rotatably connected to plates 180 and with pendulum masses 190 connected to plate 188, but swivelable with respect to plate 188.

In an example embodiment, materials 136 and 140 are fixed to portion 112A.

It should be understood that torque converter 100 is not limited to the damper, series damper, stator, or vibration absorber configurations shown.

Figure 9:
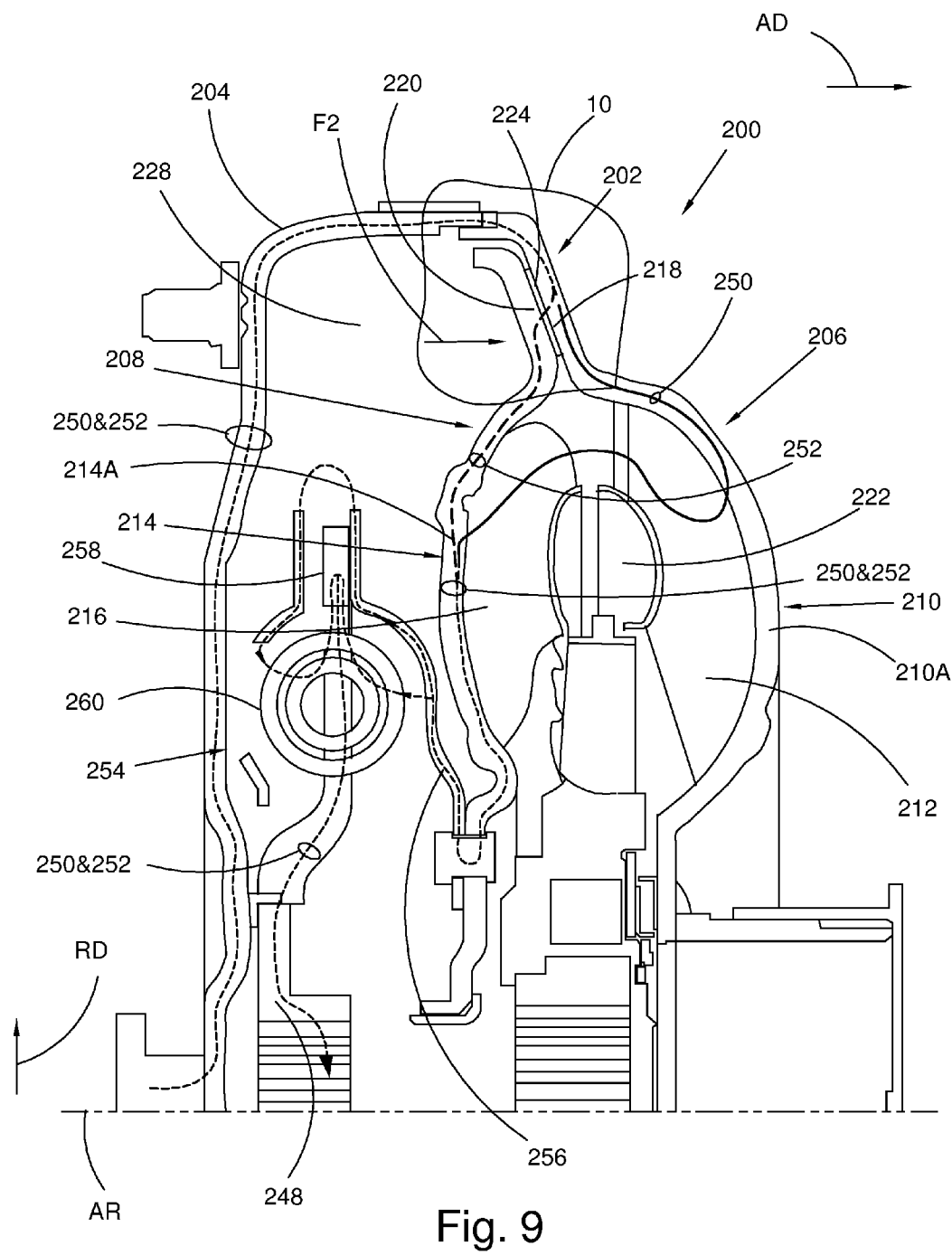
FIG. 9 is a partial cross-sectional view of a torque converter with a conical turbine clutch.

FIG. 9 is a partial cross-sectional view of torque converter 200 with conical turbine clutch 202. Torque converter 200 includes cover 204 arranged to receive torque, impeller 206, and turbine 208. Impeller 206 includes impeller shell 210 and at least one impeller blade 212 (hereinafter referred to as impeller blade 212) directly connected to portion 210A of shell 210. Turbine 208 includes turbine shell 214 and at least one turbine blade 216 (hereinafter referred to as turbine blade 216) directly attached to portion 214A of shell 214. Shell 210 includes surface 218 extending beyond impeller blade 212 in radial direction RD orthogonal to axis of rotation AR for torque converter 200. Shell 214 includes surface 220 extending beyond turbine blade 216 in radial direction RD. Torque converter 200 includes torus 222 at least partially enclosed by shells 210 and 214.

Figure 10:
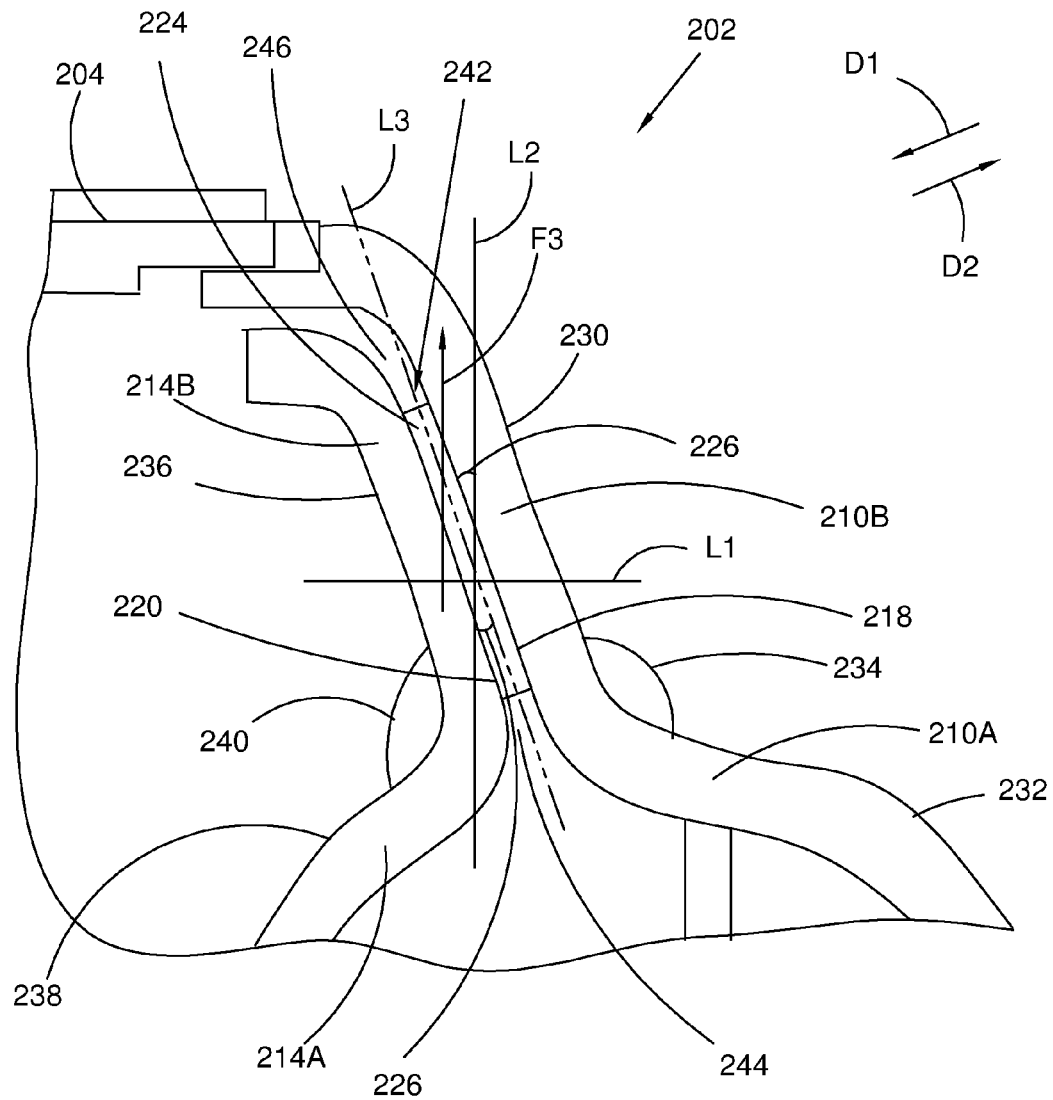
FIG. 10 is a detail of portion 10 in FIG. 9 with clutch 202 closed.
Figure 11:
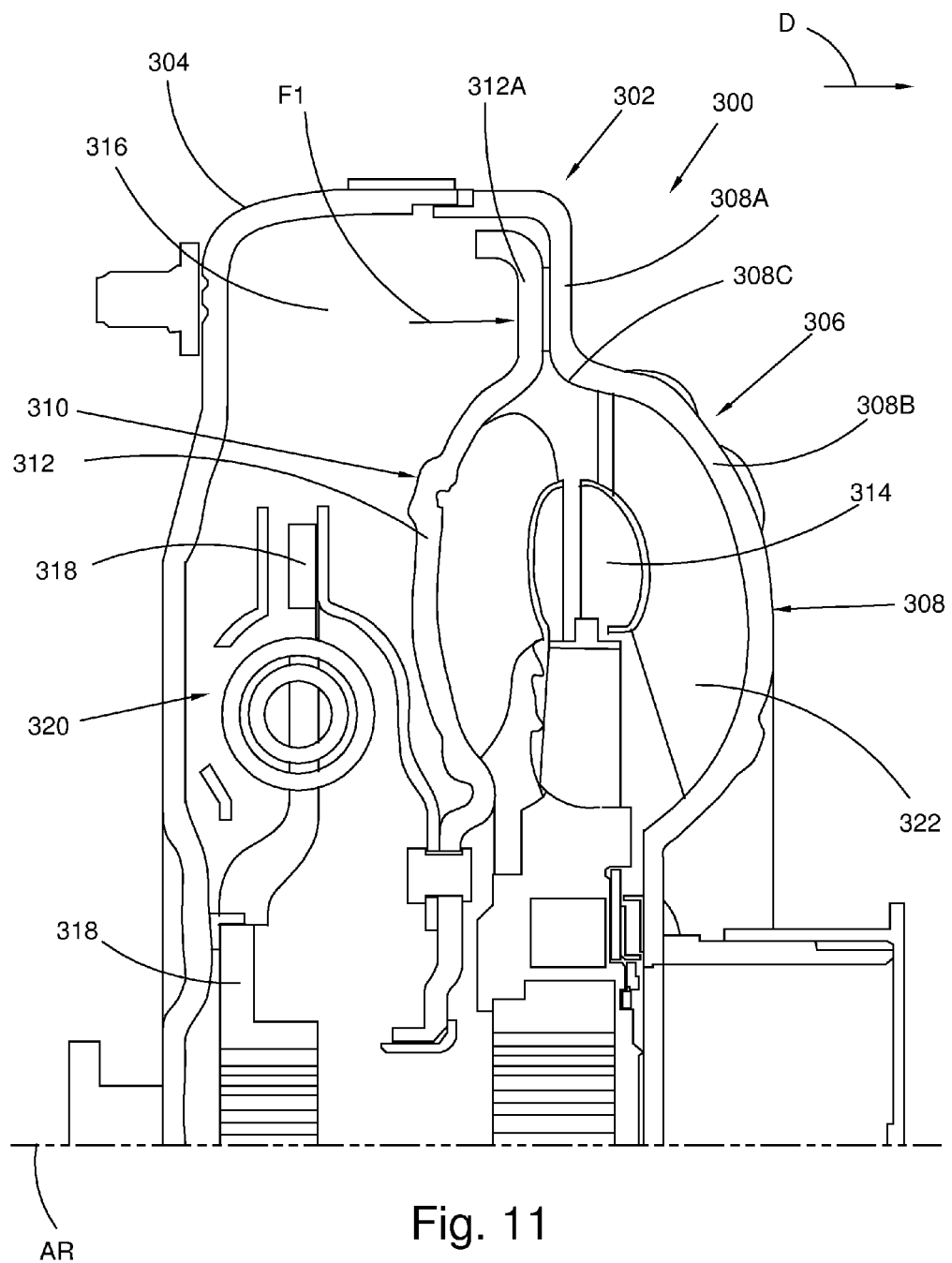
FIG. 11 is a partial cross-sectional view of a prior art torque converter with a turbine clutch.

FIG. 10 is a detail of portion 10 in FIG. 9 with clutch 202 closed. The following should be viewed in light of FIGS. 9 and 10. Turbine clutch 202 includes surfaces 218 and 220 and friction material 224 disposed between surfaces 218 and 220. Surface 220 is aligned with surface 218 so that line L1, parallel to axis AR, passes through surfaces 220 and 218. Surfaces 218 and 220 are at acute angle 226 with respect to line L2 in radial direction RD. Pressure chamber 228 is at least partially formed by turbine shell 214 and cover 204. For a torque converter mode, turbine 208 and impeller 206 are independently rotatably with respect to each other. Stated otherwise, in the torque converter mode, clutch 202 is open. For a lock-up mode, surfaces 218 and 220 are non-rotatably connected. Stated otherwise, clutch 202 is closed and surfaces 218 and 220 are non-rotatably connected with the possible exception of slip associated with normal operation of a closed clutch.

Surface 218 faces direction D1. Shell 210 includes portion 210B including surface 218 and surface 230 facing direction D2, opposite direction D1. Portion 210A includes surface 232 facing away from impeller blade 212. Surface 230 is at obtuse angle 234 with respect to surface 232.

Shell 214 includes portion 214B including surface 220 and surface 236 facing direction D1. Portion 214A includes surface 238 facing away from turbine blade 216. Surface 236 is at obtuse angle 240 with respect to surface 236.

Surface 220 faces direction D2. Clutch 202 includes space 242 between surfaces 218 and 220. Space 242 includes end 244 and end 246 radially outward of end 244. End 244 opens to torus 222. Friction material 224 is disposed in space 242. Line L3, at acute angle 226 passes through ends 244 and 246 and friction material 224 without intersecting surface 218 or surface 220. For example, line L3 is orthogonal to directions D1 and D2.

Torque converter 200 includes output hub 248 arranged to non-rotatably connect to a transmission input shaft (not shown). In the torque converter mode, torque path 250 is formed from cover 204 to output hub 248. Path 250 passes through in order: portion 210B, portion 210A, and portion 214A. Path 250 by-passes portion 214B. In the lock-up mode, torque path 252 is formed from cover 204 to output hub 248. Path 252 passes through in order: portion 210B, portion 214B, and portion 214A. Path 252 by-passes portion 210A.

In an example embodiment, converter 200 includes torsional vibration damper 254 including input part 256, output part 258 non-rotatably connected to hub 248, and at least one resilient element 260 engaged with parts 256 and 258.

Advantageously, angling portions 210B and 214B addresses the stress and strain problems noted above. Pressure in chamber 228 is increased to be greater than pressure in the torus to displace turbine shell 214 in direction AD, parallel to axis AR, to close clutch 202. Increasing the pressure in chamber 228 generates force F2, in direction AD, on portion 214B. As clutch 202 closes, force F2 is transferred to portion 210B. Advantageously, since portion 210B is at angle 226, portion 210B is able to withstand greater force F2 without flexing, avoiding stress and strain on shell 210, in particular in portion 210C connecting portions 210A and 210B. In particular, stress and strain on interior portion 260 of portion 210C is reduced.

Further, the angling of surfaces 218 and 220 increases the torque bearing capacity of clutch 202. For example, if surfaces 218 and 220 are substantially orthogonal to axis AR and force F2 is applied to close the clutch, axial force F2 is substantially acting alone against shear forces to keep clutch 202 closed. However, by angling surfaces 218 and 220, a wedge effect is created, augmenting axial force and adding force F3 in direction RD, to maintain the non-rotatable connection of surfaces 218 and 220. As a result, and in comparison to a configuration with surfaces 218 and 220 substantially orthogonal to axis of rotation AR: to attain a same torque bearing capacity for clutch 202, force F2 can be reduced with surfaces 218 and 220 at acute angle 226; or for a same force F2, the torque bearing capacity of clutch 202 is increased with surfaces 218 and 220 at acute angle 226.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:
1. A multi-function torque converter, comprising:
   a cover arranged to receive torque;
   an impeller including an impeller shell and at least one impeller blade connected to the impeller shell;
   a turbine including a turbine shell and at least one turbine blade connected to the turbine shell;
   a torus at least partially enclosed by the impeller and turbine shells;
   a first pressure chamber at least partially formed by the impeller shell and the cover;
   an impeller clutch including a portion of the impeller shell; and,
   a resilient element assembly located in the first pressure chamber, the resilient element assembly includes at least one groove and radially inward flow of fluid out of the first pressure chamber is at least partly through the at least one groove;
   wherein:
      pressure in the torus is arranged to displace the impeller shell in a first direction to substantially non-rotatably connect the portion of the impeller shell to the cover for a closed mode for the impeller clutch; and,
      the resilient element assembly urges, with a first force, the impeller shell in a second direction opposite the first direction.
2. The multi-function torque converter of claim 1, wherein:
   when a second force in the first direction, produced by pressure in the torus, is less than the first force, the resilient element assembly is arranged to displace the impeller shell in the second direction to disengage the impeller shell and cover for an open mode for the impeller clutch.

3. The multi-function torque converter of claim 1, wherein:
   the entirety of the radially inward flow of fluid out of the first pressure chamber is through the at least one groove.
4. The multi-function torque converter of claim 1, wherein:
   the resilient element assembly includes friction material in contact with the cover; and,
   the at least one groove is formed in the friction material.
5. The multi-function torque converter of claim 1, wherein the resilient element assembly includes:
   a diaphragm spring;
   a first plastic washer non-rotatably connected to a first end of the diaphragm spring, in contact with the cover, and including the at least one groove; and,
   a second plastic washer non-rotatably connected to a second end of the diaphragm spring and in contact with the impeller shell.
6. The multi-function torque converter of claim 1, wherein:
   the impeller clutch includes:
      the portion of the impeller shell located radially outward of the at least one impeller blade;
      first friction material located between the portion of the impeller shell and the cover in the first direction; and,
   in the closed mode for the impeller clutch, the portion of the impeller shell, the first friction material, and the cover are substantially non-rotatably engaged.
7. The multi-function torque converter of claim 6, wherein:
   to transition the impeller clutch from an open mode, in which the impeller shell is rotatable with respect to the cover, to the closed mode, fluid in the first pressure chamber is arranged to drain from the first pressure chamber to a sump without control of a back pressure of the fluid.
8. The multi-function torque converter of claim 6, further comprising:
   a turbine clutch including:
      a portion of the turbine shell located radially outward of the at least one turbine blade; and,
      second friction material located between the portion of the impeller shell and the portion of the turbine shell in the first direction, wherein:
         in an open mode for the turbine clutch, the portion of the turbine shell is rotatable with respect to the portion of the impeller shell; and,
         in a closed mode for the turbine clutch, the portion of the turbine shell, the second friction material, and the portion of the impeller shell are substantially non-rotatably connected.
9. The multi-function torque converter of claim 1, further comprising:
   a turbine clutch; and,
   a second pressure chamber at least partially formed by the turbine shell and the cover, wherein:
      for fluid pressure in the second pressure chamber greater than fluid pressure in the torus, the turbine shell is arranged to displace in the first direction to substantially non-rotatably connect to the impeller shell; and,
      for fluid pressure in the torus greater than the fluid pressure in the second chamber, the turbine shell is arranged to displace in the second direction so that the turbine shell is rotatable with respect to the impeller shell.

10. The multi-function torque converter of claim 9, further comprising:
a first fluid circuit arranged to control flow of pressurized fluid to the torus;
a second fluid circuit arranged to control flow of pressurized fluid to the second pressure chamber; and,
a third fluid circuit arranged to passively drain fluid from the first pressure chamber.

11. A multi-function torque converter, comprising:
a cover arranged to receive torque;
an impeller including an impeller shell and at least one impeller blade connected to the impeller shell;
a turbine including a turbine shell and at least one turbine blade connected to the turbine shell;
a torus at least partially enclosed by the impeller and turbine shells;
a first pressure chamber at least partially formed by the impeller shell and the cover;
an impeller clutch including a portion of the impeller shell; and,
a resilient element assembly located in the first pressure chamber, the resilient element assembly includes at least one groove and radially inward flow of fluid out of the first pressure chamber is at least partly through the at least one groove;
wherein:
fluid pressure in the torus is arranged to exert a first force on the impeller shell to displace the impeller shell in a first direction to substantially non-rotatably connect the portion of the impeller shell to the cover for a closed mode for the impeller clutch;
the resilient element assembly applies a second force to the impeller shell in a second direction opposite the first direction; and,
when the second force is greater than the first force, the resilient element assembly is arranged to displace the impeller shell in the second direction to disengage the impeller shell and cover for an open mode for the impeller clutch.

12. The multi-function torque converter of claim 11, wherein:
the portion of the impeller shell is located radially outward of the at least one impeller blade;
the impeller clutch includes first friction material located between the portion of the impeller shell and the cover in the first direction; and,
in the closed mode for the impeller clutch, the portion of the impeller shell, the first friction material, and the cover are substantially non-rotatably engaged.

13. The multi-function torque converter of claim 12, wherein:
to transition the impeller clutch from the open mode in which the impeller shell is rotatable with respect to the cover to the closed mode, fluid in the first pressure chamber is arranged to drain from the first pressure chamber to a sump without control of a back pressure of the fluid.

14. The multi-function torque converter of claim 12, further comprising:
a turbine clutch including:
a portion of the turbine shell located radially outward of the at least one turbine blade; and,
second friction material located between the portion of the turbine shell and the portion of the impeller shell in the first direction, wherein:
in an open mode for the turbine clutch, the portion of the turbine shell is rotatable with respect to the portion of the impeller shell; and,
in a closed mode for the turbine clutch, the portion of the turbine shell, the second friction material, and the portion of the impeller shell are substantially non-rotatably engaged.

15. The multi-function torque converter of claim 11, further comprising:
a turbine clutch; and,
a second pressure chamber at least partially formed by the turbine shell and the cover, wherein:
when fluid pressure in the second pressure chamber is greater than the fluid pressure in the torus, the turbine shell is arranged to displace in the first direction to substantially non-rotatably connect to the impeller shell; and,
when the fluid pressure in the second pressure chamber is less than the fluid pressure in the torus, the turbine shell is arranged to displace in the second direction so that the turbine shell is rotatable with respect to the impeller shell.

16. The multi-function torque converter of claim 15, further comprising:
a first fluid circuit arranged to control flow of first pressurized fluid to the torus;
a second fluid circuit arranged to control flow of second pressurized fluid to the second pressure chamber; and,
a third fluid circuit arranged to passively drain fluid from the first pressure chamber.

17. A multi-function torque converter, comprising:
a cover arranged to receive torque;
an impeller including an impeller shell and at least one impeller blade connected to the impeller shell;
a turbine including a turbine shell and at least one turbine blade connected to the turbine shell;
a torus at least partially enclosed by the impeller and turbine shells;
a first pressure chamber at least partially formed by the impeller shell and the cover;
a second pressure chamber at least partially formed by the turbine shell and the cover;
an impeller clutch including a portion of the impeller shell;
a resilient element assembly located in the first pressure chamber and urging the impeller shell in a first direction with a first force, the resilient element assembly includes at least one groove and radially inward flow of fluid out of the first pressure chamber is at least partly through the at least one groove; and,
a turbine clutch including a portion of the turbine shell, wherein:
when a second force, produced by fluid pressure in the torus, in a second direction opposite the first direction is greater than the first force, the second force is arranged to displace the impeller shell in the second direction to substantially non-rotatably connect the portion of the impeller shell and the cover for a closed mode for the impeller clutch;
when the first force is greater than the second force, the resilient element assembly is arranged to displace the impeller shell in the first direction to disengage the impeller shell and cover for an open mode for the impeller clutch; and,
a difference in the fluid pressure in the torus and fluid pressure in the second chamber is arranged to displace the turbine shell in the first or second direction to disengage or engage, respectively, the portion of the turbine shell with the portion of the impeller shell.

18. The multi-function torque converter of claim 17, further comprising:
   a first fluid circuit arranged to control flow of first pressurized fluid to the torus;
   a second fluid circuit arranged to control flow of second pressurized fluid to the second pressure chamber; and,
   a third fluid circuit arranged to passively drain fluid from the first pressure chamber.

\* \* \* \* \*